(12) United States Patent
Rao et al.

(10) Patent No.: US 9,843,931 B2
(45) Date of Patent: Dec. 12, 2017

(54) ELECTRONIC DEVICE

(71) Applicant: JIENG TAI INTERNATIONAL ELECTRONIC CORP., New Taipei (TW)

(72) Inventors: Pei-Zong Rao, New Taipei (TW); Yu-Pang Chou, New Taipei (TW); Jyh-Hui Chang, New Taipei (TW)

(73) Assignee: JIENG TAI INTERNATIONAL ELECTRONIC CORP., New Taipei (TW)

(*) Notice: Subject to any disclaimer, the term of this patent is extended or adjusted under 35 U.S.C. 154(b) by 93 days.

(21) Appl. No.: 14/814,479

(22) Filed: Jul. 30, 2015

(65) Prior Publication Data
US 2016/0165441 A1 Jun. 9, 2016

(30) Foreign Application Priority Data
Dec. 3, 2014 (TW) .............. 103142039 A

(51) Int. Cl.
| | |
|---|---|
| H04L 29/06 | (2006.01) |
| H04W 12/06 | (2009.01) |
| G06F 21/32 | (2013.01) |
| H04W 4/00 | (2009.01) |
| H04W 88/02 | (2009.01) |

(52) U.S. Cl.
CPC .......... *H04W 12/06* (2013.01); *G06F 21/32* (2013.01); *H04W 4/008* (2013.01); *H04L 63/0861* (2013.01); *H04W 88/02* (2013.01)

(58) Field of Classification Search
CPC ..... H04W 12/06; H04W 12/08; H04W 4/008; H04W 88/02; G06F 21/31; G06F 21/32; H04L 63/0861

USPC ............................................................. 726/7
See application file for complete search history.

(56) References Cited

U.S. PATENT DOCUMENTS

| | | | |
|---|---|---|---|
| 2010/0082444 A1* | 4/2010 | Lin ...................... | G06Q 20/042 705/17 |
| 2013/0231046 A1* | 9/2013 | Pope .................. | G06K 9/00013 455/41.1 |
| 2013/0262305 A1* | 10/2013 | Jones ................... | H04B 5/0031 705/44 |

(Continued)

FOREIGN PATENT DOCUMENTS

| | | |
|---|---|---|
| CN | 103248767 A | 8/2013 |
| TW | 201411447 A | 3/2014 |
| TW | M484867 U | 8/2014 |

*Primary Examiner* — Yogesh Paliwal
(74) *Attorney, Agent, or Firm* — CKC & Partners Co., Ltd.

(57) ABSTRACT

An electronic device includes a display module, an NFC (Near-field Communication) module, a verification module and a control module. The display module is disposed on a first surface of the electronic device. The NFC module includes an antenna unit. The antenna unit is configured to transmit and receive a wireless signal from an outward direction of the first surface. The verification module is disposed on a second surface of the electronic device. The verification module is configured to generate an identification input data according to an operation of a user. The control module is configured to drive the verification module to generate the identification input data when the NFC module receives an identification requirement data, and configured to determine whether the identification input data is valid.

9 Claims, 4 Drawing Sheets

(56) References Cited

U.S. PATENT DOCUMENTS

2014/0011452 A1* 1/2014 Ji ........................... H04B 5/00
455/41.1
2014/0256251 A1 9/2014 Caceres et al.

* cited by examiner

ELECTRONIC DEVICE

This application claims priority to Taiwan Application Serial Number 103142039, filed Dec. 3, 2014, which is herein incorporated by reference.

BACKGROUND

Field of Disclosure

The disclosure relates to an electronic device, and more particularly, to a electronic device having near-field communication.

Description of Related Art

Near-field communication is a short-range high-frequency wireless communication technology in which interconnection and intercommunication between electronic devices within a short distance (e.g., 4 centimeter) can be realized by using 13.36 MHz frequency band. Because the near field communication provides great convenience to the transmission, management, and storage of information and tends to transact within a short distance, it is quite suitable for the exchange of important information, such as financial information or personal information. Many of today's consumer electronics, such as mobile phones, personal digital assistants (PDAs), tablet personal computers, notebook computers, etc., have been equipped with near field communication chips to perform personal identification, information exchange, or transaction payments.

In general mobile communication devices, near-field communication chip is fabricated on a backside of the mobile communication devices (opposite to the display screen which is on a front side of the mobile communication devices). Therefore, when the user transmits and receives data through the near-field communication antenna (i.e., put the backside of the mobile communication device toward a transceiver device), the user can execute the corresponding operations through the display screen of the device. However, in order to execute operations through the display screen, the location and the area of the near-filed communication chip are limited (e.g., the near-filed communication chip only can be disposed on the backside of the mobile device).

On the other hand, if the near-field communication antenna is disposed on the front side of the mobile communication devices (i.e., the surface on which the display screen is), the user fails to execute the operations through the display screen of the mobile communication device on the condition of transmitting and receiving data through the near-field communication antenna. For example, when the user pays by the mobile communication device, the user fails to input password through the display screen directly to accomplish identification. Therefore, when utilizing near-field communication to carry out transaction, the operation of the mobile communication device is limited in location of the near-filed communication chip, so that utilization of near-field communication is limited.

SUMMARY

One aspect of the disclosure is to provide an electronic device. The electronic device includes a display module, an NFC (Near-Field Communication) module, a verification module and a control module. The display module is disposed on a first surface of the electronic device. The NFC module includes a first antenna unit. The first antenna unit is configured to transmit and receive first wireless signals from an outward direction of the first surface. The verification module is disposed on a second surface of the electronic device, and the second surface is different from the first surface. The verification module is configured to generate an identification input data according to an operation of a user. The control module is configured to drive the verification module to generate the identification input data when the NFC module receives an identification requirement data, and configured to determine whether the identification input data is valid.

According to one embodiment of the disclosure, the verification module includes an image sensing unit. The verification module generates the identification input data according to an image data sensed by the image sensing unit when the verification module is driven. The control module compares the image data with a predetermined verified image data to determine whether the identification input data is valid.

According to one embodiment of the disclosure, the verification module includes an audio receiving unit. The verification module generates the identification input data according to an audio signal received by the audio receiving unit when the verification module is driven. The control module compares the audio signal with a predetermined verified audio signal to determine whether the identification input data is valid.

According to one embodiment of the disclosure, the verification module includes a fingerprint identification unit. The verification module generates the identification input data according to a fingerprint data received by the fingerprint identification unit when the verification module is driven. The control module compares the fingerprint data with a predetermined verified fingerprint data to determine whether the identification input data is valid.

According to one embodiment of the disclosure, the verification module includes several control buttons. The verification module generates the identification input data according to an operation order corresponding to operations received by the control buttons when the verification module is driven. The control module compares the operation order with a predetermined verified operation order to determine whether the identification input data is valid.

According to one embodiment of the disclosure, the second surface is on a backside of the electronic device and is opposite to the first surface.

According to one embodiment of the disclosure, the second surface is on a side of the electronic device and is substantially perpendicular to the first surface.

According to one embodiment of the disclosure, the NFC module includes a second antenna unit configured to transmit and receive second wireless signals from an outward direction of a third surface of the electronic device, and the third surface is different from the first surface. The NFC module receives the identification requirement data through the second antenna unit.

According to one embodiment of the disclosure, the third surface is on a side of the electronic device and is substantially perpendicular to the first surface.

According to one embodiment of the disclosure, the second surface is on another side of the electronic device and is substantially perpendicular to the first surface.

BRIEF DESCRIPTION OF THE DRAWINGS

The disclosure can be more fully understood by reading the following detailed description of the embodiment, with reference made to the accompanying drawings as follows.

DETAILED DESCRIPTION

Figure 1A:
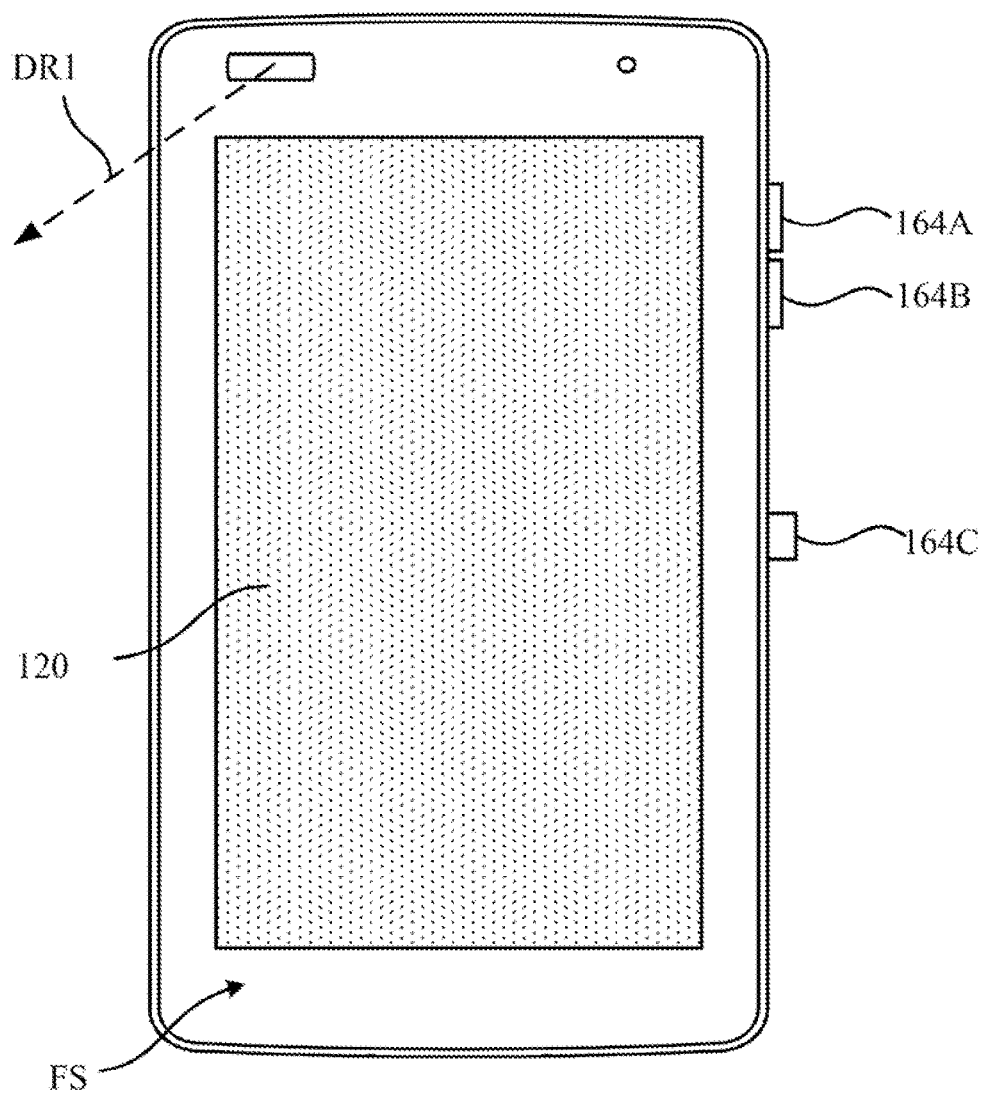
FIG. 1A illustrates a front view diagram of an electronic device according to a first embodiment of the disclosure.

Reference will now be made in detail to embodiments of the disclosure, examples of which are illustrated in the accompanying drawings. However, the embodiments do not intend to limit the scope covered by the present disclosure, and the descriptions regarding structures and operation do not limit their operation sequence. Any devices or structures formed by elements re-combinations and having equivalent effects are all within the scope covered by the present disclosure. Wherever possible, the same reference numbers are used in the drawings and the description to refer to the same or like parts.

Figure 1B:
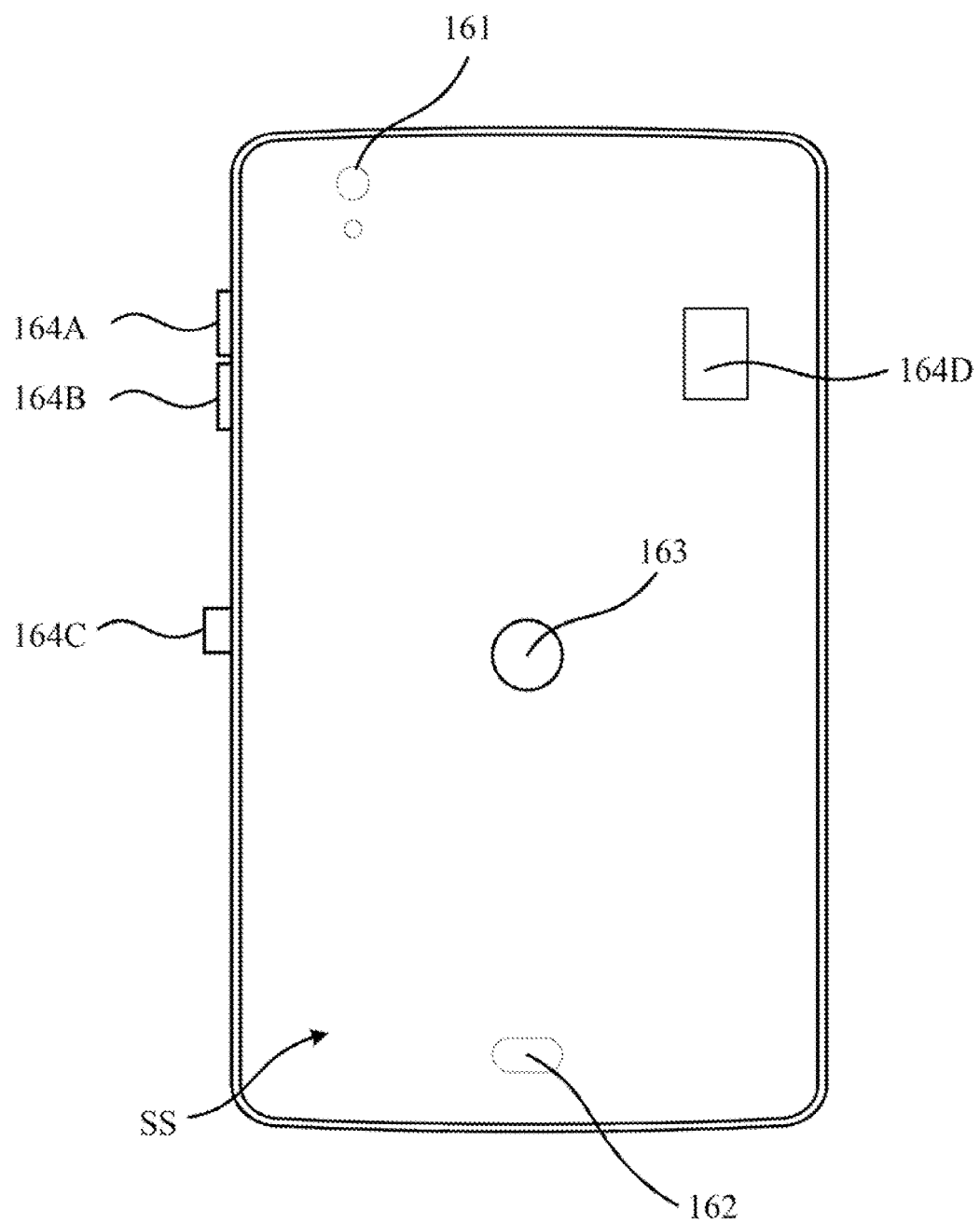
FIG. 1B illustrates a back view diagram of the electronic device according to the first embodiment of the disclosure.
Figure 1C:
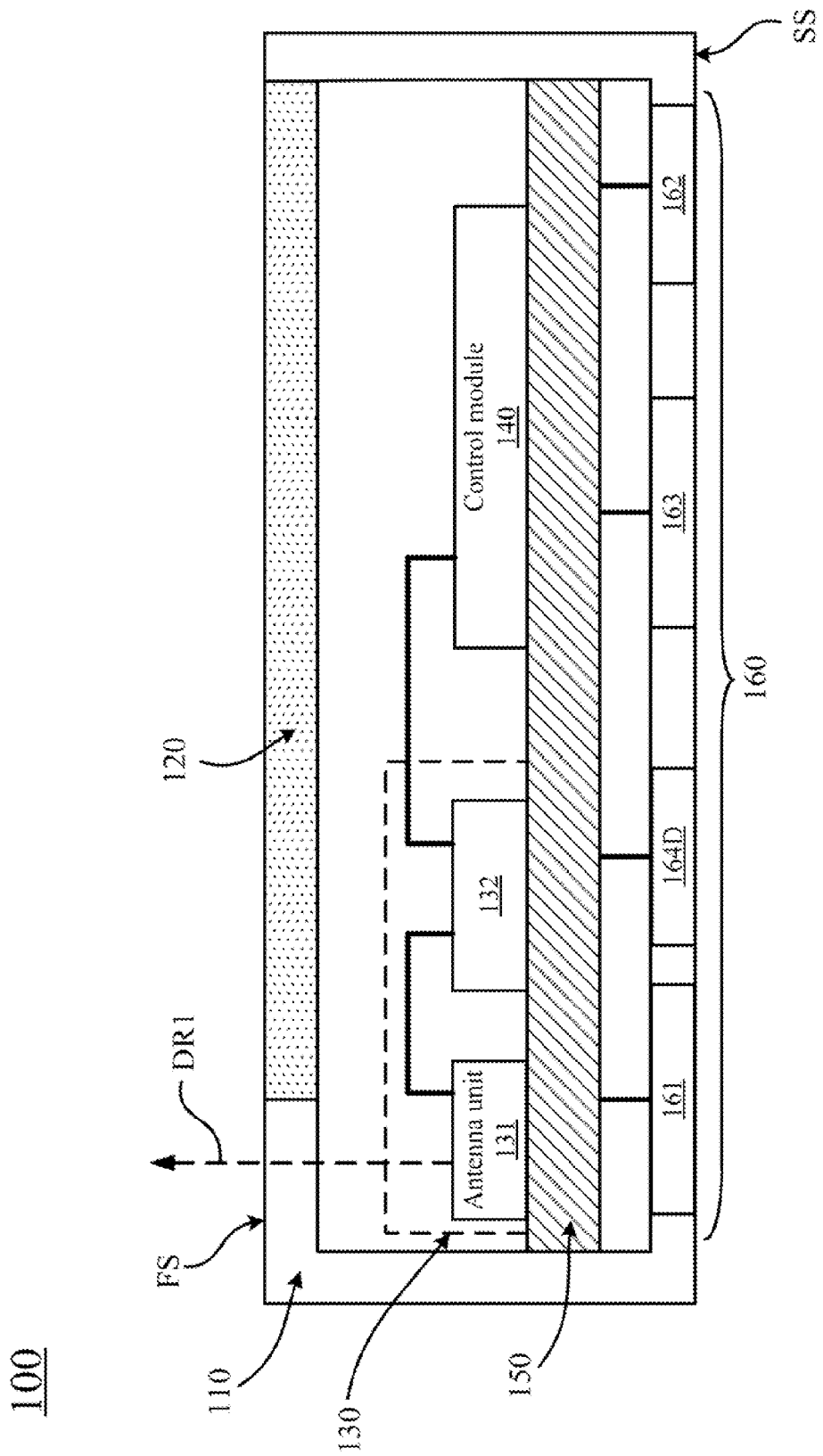
FIG. 1C illustrates a section view diagram of the electronic device according to the first embodiment of the disclosure.

Reference is made to FIG. 1A, FIG. 1B and FIG. 1C. FIG. 1A illustrates a front view diagram of an electronic device 100 according to a first embodiment of the disclosure. FIG. 1B illustrates a back view diagram of the electronic device 100 according to the first embodiment of the disclosure. FIG. 1C illustrates a section view diagram of the electronic device 100 according to the first embodiment of the disclosure. The electronic device is applicable to any mobile communication device such as a mobile phone, PDA (Personal Digital Assistant), tablet computer, etc. In the present embodiment, the electronic device 100 is a mobile phone, but the present embodiment is not limited in this regard. The electronic device 100 includes a case 110, a display module 120, an NFC (Near-Field Communication) module 130, a control module 140, a circuit board 150 and a verification module 160. The case 110 includes a first surface FS and a second surface SS. The second surface SS is different from the first surface ES. In the present embodiment, the first surface FS is on a front side of the electronic device 100 (e.g., a surface of displaying images). The second surface SS is opposite to the first surface FS, that is, the second surface SS is on a backside of the electronic device 100, but the present embodiment is not limited in this regard. In other embodiments, the second surface SS can also be on a side of the electronic device 100, that is, the second surface SS is substantially perpendicular to the first surface FS.

As shown in FIG. 1C, the display module 120 is disposed on the first surface FS. The NFC module 130 and the control module 140 are disposed on the circuit board 150. The display module 120 is configured to display images and configured to provide an operation interface to a user. The NFC module 130 includes an antenna unit 131 and a radio frequency unit 132. The antenna unit 131 is configured to transmit and receive wireless signals from an outward direction DR1 of the first surface FS. The radio frequency module 132 is configured to demodulate the signals received by the antenna unit 131, or configured to modulate the signals and transmit the modulated signals through the antenna unit 131.

The verification module 160 is disposed on the second surface SS, and is configured to generate an identification input data according to an operation of a user. In the present embodiment, when data received by the antenna unit 131 is an identification requirement data, the control module 140 drives the verification module 160. At this time, the verification module 160 can generate the identification input data according to the operation of the user, and the control module 140 can determine whether the identification input data is valid.

For example, when the user carries out transaction through the antenna unit 131 of the NFC module 130 (e.g., the user put the first surface FS of the electronic device 100 towards the transceiver device), a transceiver device (not shown in the figure) transmits the identification requirement data (e.g., a requirement data for identifying the user) to the electronic device 100. The control module 140 receives the identification requirement data through the antenna unit 131, and drives the verification module 160. The driven verification module 160 can generate the identification input data according to an operation of the user. For example, the user can touch a fingerprint identification unit 163 of the verification module 160 to generate a fingerprint of the user. Next, the control module 140 can determine whether the identification input data is valid. For example, the fingerprint of the user can be compared with a predetermined fingerprint. If the fingerprint of the user conforms to the predetermined fingerprint, then the identification input data is determined as valid, that is, the present user is confirmed as an owner of the electronic device 100.

As shown in FIG. 1B and FIG. 1C, in the present embodiment, the verification module 160 includes an image sensing module 161. When the verification module 160 is driven, the verification module 160 generates the identification input data according to an image data sensed by the image sensing unit 161. The control module 140 compares the image data with a verified image data to determine whether the identification data is valid, thereby accomplishing identification.

In one embodiment, the image sensing unit 161 is a camera lens or other image capturing devices. The predetermined verified image data can be a face image data or other characteristic image data captured in advance by the user.

For example, when the user carries out transaction through the antenna unit 131 of the NFC module 130 and the electronic device 100 receives the identification requirement data through the antenna unit 131, the control module 140 drives the image sensing unit 161 of the verification module 160. At this time, the image sensing unit 161 can sense the users face and generate a face image data corresponding to the user's face. The control unit 140 can compare the face image data generated by the image sensing unit 161 with a predetermined face image data of the user to determine whether the present user of the electronic device 100 is a predetermined owner, thereby accomplishing identification.

As shown in FIG. 1B and FIG. 1C, in the present embodiment, the verification module 166 includes an audio receiving module 162. When the verification module 160 is driven, the verification module 160 generates the identification input data according to an audio signal received by the audio receiving unit 162. The control module 140 compares the audio signal with a predetermined verified audio signal to determine whether the identification data is valid, thereby accomplishing identification.

In one embodiment, the audio receiving unit 162 is a microphone or other audio capturing devices. The predetermined verified audio signal can be an audio signal of a piece of talk or music recorded in advance by the user.

For example, when the user carries out transaction through the antenna unit 131 of the NFC module 130 and the electronic device 100 receives the identification requirement data through the antenna unit 131, the control module 140 drives the audio receiving unit 162 of the verification module 160. At this time, the audio receiving unit 162 can receive an audio signal generated from the user. The control unit 140 can compare a voiceprint of the audio signal received by the audio receiving unit 162 with a voiceprint of a predetermined audio signal of the user to determine whether the present user of the electronic device 100 is a predetermined owner, thereby accomplishing identification.

As shown in FIG. 1B and FIG. 1C, in the present embodiment, the verification module 160 includes a fingerprint identification unit 163. When the verification module 160 is driven, the verification module 160 generates the identification input data according to a fingerprint received by the fingerprint identification unit 163. The control module 140 compares the fingerprint data with a predetermined verified fingerprint data to determine whether the identification data is valid, thereby accomplishing identification.

In one embodiment, the predetermined verified fingerprint data can be a fingerprint of any finger of the right hand or left hand inputted in advance by the user.

For example, when the user carries out transaction through the antenna unit 131 of the NFC module 130 and the electronic device 100 receives the identification requirement data through the antenna unit 131, the control module 140 drives the fingerprint identification unit 163 of the verification module 160. At this time, the user can touch the fingerprint identification unit 163, so as to generate a fingerprint of the user by the fingerprint identification unit 163. The control unit 140 can compare the fingerprint generated by the fingerprint identification unit 163 with a predetermined fingerprint of the user to determine whether the present user of the electronic device 100 is a predetermined owner, thereby accomplishing identification.

As shown in FIG. 1B and FIG. 1C, in the present embodiment, the verification module 160 includes several control buttons 164A-164D. When the verification module 160 is driven, the verification module 160 generates the identification input data according to an operation order corresponding to operations received by the control buttons 164A-164D. The control module 140 compares the operation order with a predetermined verified operation order to determine whether the identification data is valid, thereby accomplishing identification.

In one embodiment, the control buttons 164A-164D include a volume button, a power button, a home button, a shutter release button, or other physical buttons. The predetermined verified operation order can be an order of pushing control buttons 164A-164D set in advance by the user.

For example, when the user carries out transaction through the antenna unit 131 of the NFC module 130 and the electronic device 100 receives the identification requirement data through the antenna unit 131, the control module 140 drives the control buttons 164A-164D. At this time, the user can push the control buttons 164A-164D according to an order, so as to generate an operation order corresponding to the control buttons 164A-164D. The control module 140 can compare the operation order received by the control buttons 164A-164O with a predetermined order of pushing control buttons 164A-164D to determine whether the present user of the electronic device 100 is a predetermined owner, thereby accomplishing identification.

It is noted that the foregoing image sensing unit 161, the audio receiving unit 162 and the fingerprint identification unit 163 are not limited in disposing on the backside (e.g. the second surface SS) of the electronic device 100 For example, the image sensing unit 161, the audio receiving unit 162 and the fingerprint identification unit 163 can also be disposed on any side (like control buttons 164A-164D) of the electronic device 100, but the disclosure is not limited in this regard.

According to the aforementioned embodiments, the user does not have to execute operations (e.g., identification) only through the display module 120. In other words, the convenience of exchanging data in near-filed communication is increased by adding the verification module 160. Moreover, the antenna unit 131 of the NFC module 130 is not limited in disposing on the backside of the electronic device 100 (e.g., mobile phone). Therefore, the disposed location of the antenna unit 131 is more flexible and it is more convenient to operate the electronic device 100 for near field communication.

Figure 2:
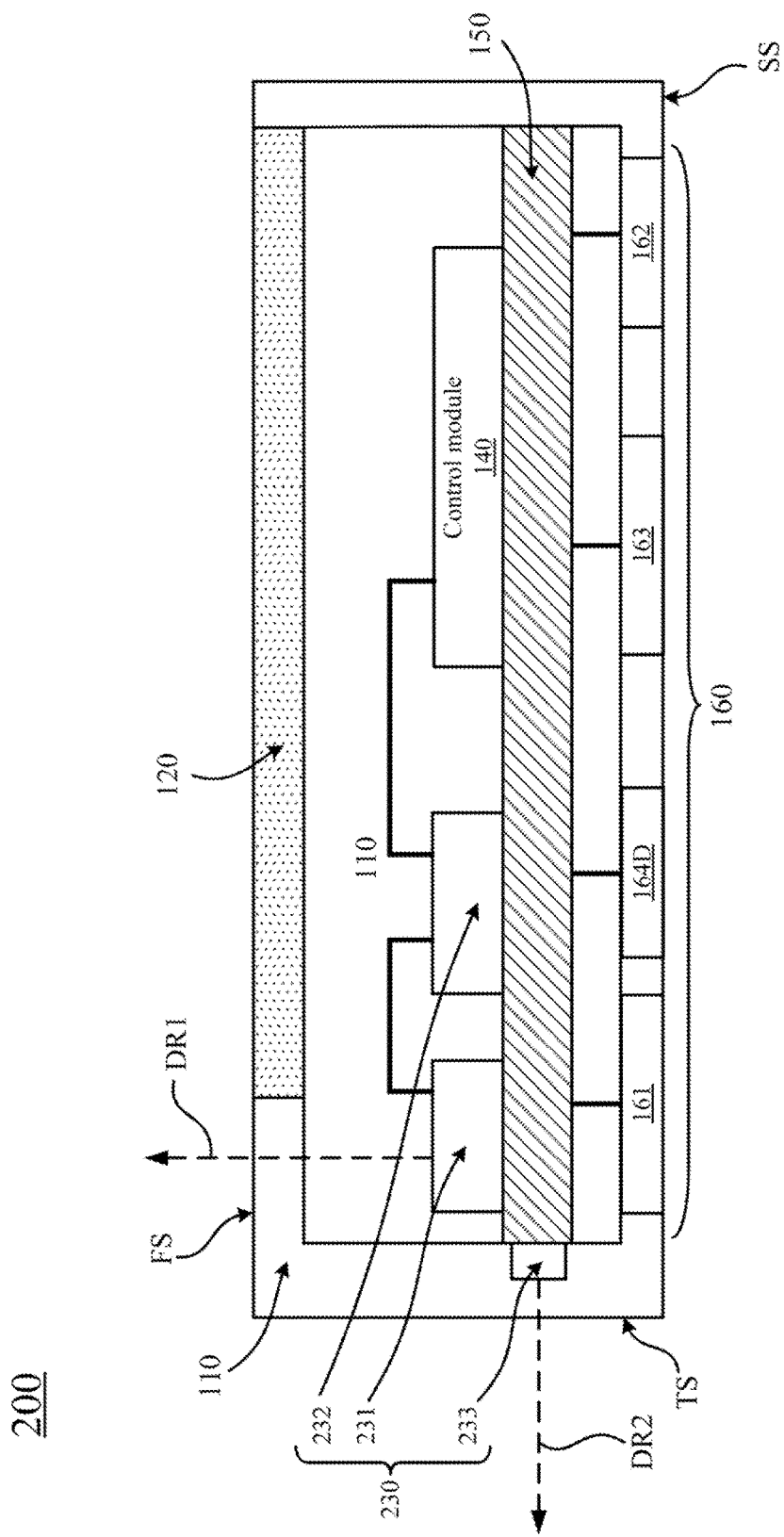
FIG. 2 illustrates a section view diagram of an electronic device according to a second embodiment of the disclosure.

Reference is made to FIG. 2. FIG. 2 illustrates a section view diagram of an electronic device 200 according to a second embodiment of the disclosure. In the present embodiment, the electronic device 200 includes the case 110, the display module 120, the NFC (Near-Field Communication) module 230, the control module 140, the circuit board 150 and the verification module 160. The connections and operations of the case 110, the display module 120, the control module 140, the circuit board 150 and the verification module 160 are similar to that of the electronic device 100 in FIG. 1C, and thus they are not further detailed herein. In the present embodiment, the NFC module 230 includes a first antenna unit 231, a radio frequency unit 232 and a second antenna unit 233. The first antenna unit 231 is configured to transmit and receive wireless signals from an outward direction DR1 of the first surface FS. The second antenna unit 233 is configured to transmit and receive wireless signals from an outward direction DR2 of a third surface TS. The third surface TS is different from the first surface FS. The radio frequency module 232 is configured to demodulate the signals received by one of the first antenna unit 231 and the second antenna unit 232, or configured to modulate the signals and transmit the modulated signals through one of the first antenna unit 231 and the second antenna unit 232.

In one embodiment, the third surface TS is on a side of the electronic device 100, and is substantially perpendicular to the first surface FS. It is noted that location of the third surface TS is exemplary in the present embodiment, and the disclosure is not limited in this regard. In other embodiments, the third surface TS can be on any of four sides of the electronic device 200.

In one embodiment, the third surface TS is different from the second surface SS, too. For example, if the second surface SS is on the backside of the electronic device 200, then the third surface TS can be on any of four sides of the electronic device 200. Moreover, if the second surface SS is on any of four sides of the electronic device 200, then the third surface TS can be on any of other three sides of the electronic device 200.

Specifically, the user can select one of the first antenna unit 231 and the second antenna unit 233 of the electronic device 200 to transmit and receive wireless signals. In other words, the electronic device 200 can receive the identification requirement data transmitted from an outer transceiver device (not shown in the figure) through one of the first antenna unit 231 and the second antenna unit 233 selectively. Then, the received identification requirement data is transmitted to the control module 140 to execute the flow of identification. The flow of identification is described in aforementioned embodiments, and thus they are not further detailed herein.

Accordingly, the disposed location of the NFC module 230 is more flexible. Moreover, the range of transmitting and receiving data in near-field communication can also be increased by adding another antenna unit located on other locations of the electronic device 200. Therefore, it is more convenient to operate the electronic device 200 for near field communication.

To sum up, in the disclosure, the near-field communication antenna is not limited in disposing on the backside of the mobile communication device, so that the disposed location of the near-field communication chip is more flexible. Moreover, the user does not have to execute operations (e.g., identification) only through the display module 120, so that the convenience of exchanging data in near-filed communication is increased. Furthermore, the range of transmitting and receiving data in near-field communication can also be increased by adding another near-field communication antenna located on other locations of the electronic device 200. Therefore, it is more convenient to operate the mobile communication device for near field communication.

Although the disclosure has been described in considerable detail with reference to certain embodiments thereof, other embodiments are possible. It will be apparent to those skilled in the art that various modifications and variations can be made to the structure of the disclosure without departing from the scope or spirit of the disclosure. In view of the foregoing, it is intended that the disclosure cover modifications and variations of this disclosure provided they fall within the scope of the following claims.

What is claimed is:

1. An electronic device, comprising:
   a display module disposed on a first surface of the electronic device;
   an NFC (Near-Field Communication) module comprising a first antenna unit, wherein the first antenna unit is configured to transmit and receive first wireless signals from an outward direction of the first surface;
   a verification module disposed on a second surface of the electronic device, and the second surface is different from the first surface, wherein the verification module is configured to generate an identification input data according to an operation of a user; and
   a control module configured to drive the verification module to generate the identification input data when the NFC module receives an identification requirement data, and configured to determine whether the identification input data is valid,
   wherein the verification module comprises a plurality of control buttons, wherein the verification module generates the identification input data according to an operation order corresponding to a plurality of operations received by the control buttons when the verification module is driven, the control module compares the operation order with a predetermined verified operation order to determine whether the identification input data is valid,
   wherein the control buttons includes a volume button, a power button, a home button and a shutter release button.

2. The electronic device of claim 1, wherein the verification module comprises an image sensing unit, wherein the verification module generates the identification input data according to an image data sensed by the image sensing unit when the verification module is driven, the control module compares the image data with a predetermined verified image data to determine whether the identification input data is valid.

3. The electronic device of claim 1, wherein the verification module comprises an audio receiving unit, wherein the verification module generates the identification input data according to an audio signal received by the audio receiving unit when the verification module is driven, the control module compares the audio signal with a predetermined verified audio signal to determine whether the identification input data is valid.

4. The electronic device of claim 1, wherein the verification module comprises a fingerprint identification unit, wherein the verification module generates the identification input data according to a fingerprint data received by the fingerprint identification unit when the verification module is driven, the control module compares the fingerprint data with a predetermined verified fingerprint data to determine whether the identification input data is valid.

5. The electronic device of claim 1, wherein the second surface is on a backside of the electronic device and is opposite to the first surface.

6. The electronic device of claim 1, wherein the second surface is on a side of the electronic device and is perpendicular to the first surface.

7. The electronic device of claim 1, wherein the NFC module comprises a second antenna unit configured to transmit and receive second wireless signals from an outward direction of a third surface of the electronic device, and the third surface is different from the first surface, wherein the NFC module receives the identification requirement data through the second antenna unit.

8. The electronic device of claim 7, wherein the third surface is on a side of the electronic device and is perpendicular to the first surface.

9. The electronic device of claim 8, wherein the second surface is on another side of the electronic device and is perpendicular to the first surface.

* * * * *